METHOD FOR DIRECTLY RECORDING LIGHT PATTERNS

Filed Oct. 1, 1971 2 Sheets-Sheet 1

METHOD FOR DIRECTLY RECORDING LIGHT PATTERNS

Filed Oct. 1, 1971 2 Sheets-Sheet 2

3,752,667

METHOD FOR DIRECTLY RECORDING LIGHT PATTERNS

Anthony D'Onofrio, West Hartford, Conn., assignor to Litton Business Systems, Inc., New York, N.Y.

Continuation-in-part of abandoned application Ser. No. 722,925, Apr. 22, 1968. This application Oct. 1, 1971, Ser. No. 185,863
Int. Cl. G03g 17/00
U.S. Cl. 96—1 E 9 Claims

ABSTRACT OF THE DISCLOSURE

A method for directly producing visible reproductions of light patterns in heat sensitive record sheet material. The record sheet material is placed contiguous to a photoconductive plate and is dielectrically heated to recording temperature opposite areas of the photoconductive plate exposed to light pattern intensities of predetermined magnitude by potential gradients resulting from the channelling of high frequency electric fields through the record sheet material by the light produced conductivity patterns in the photoconductive plate. Positives or negatives of light patterns may be produced by controlling light pattern intensities.

This application is a continuation-in-part of copending application Ser. No. 722,925 filed Apr. 22, 1968, and now abandoned.

This invention is a method for directly recording light patterns; more particularly it is a method for directly recording light patterns by selectively dielectrically heating record sheet material to recording temperatures in accordance with light pattern intensities of predetermined magnitude; and specifically it is a method for recording light patterns wherein areas of a photoconductive plate exposed to light pattern intensities of predetermined magnitude channel high frequency electric fields through contiguous record sheet material such that the resulting potential gradients in the record sheet material will dielectrically heat it to recording temperature over areas defining the incident light pattern.

In accordance with a first embodiment of the invention record sheet material in the form of visibly heat sensitive sheets is sandwiched between a photoconductive plate and a conductive plate. Following exposure of the photoconductive plate to a light pattern and during the life of its change in conductivity an alternating voltage of predetermined magnitude and frequency is applied across the photoconductive and conductive plates. The conductivity pattern of the photoconductive plate produced by light pattern intensities of predetermined magnitude act to channel the electric field between plates such that the resulting potential gradients visibly dielectrically heat the record sheet over areas in the plane of the record sheet defining the light pattern in a predetermined time.

In a second embodiment of the invention spaced electrodes across which an alternating voltage of predetermined magnitude and frequency is to be applied are positioned relative to a photoconductive plate and a parallel record sheet such that the electric field extending between electrodes passes within the planes of the photoconductive plate and record sheet. As in the first embodiment, the photoconductive plate is exposed to light pattern and during the life of the change in conductivity the alternating voltage is applied and the conductivity pattern in the photoconductive plate produced by light pattern intensities of predetermined magnitude channel the electric field between electrodes such that the resulting potential gradients dielectrically heat the record sheet over areas in the plane of the record sheet defining the light pattern in a predetermined time.

A feature of the invention resides in the fact that the record sheet or sheets may be selectively dielectrically heated to recording temperature to produce positives or negatives of light patterns incident on a contiguous photoconductive plate by control of the levels of illumination defining a light pattern.

This is by reason of the fact that a light pattern defined by areas of low and high intensities, and by the discovery that a record sheet is heated to recording temperature or marked opposite areas of the photoconductive plate exposed to light pattern intensities of a predetermined magnitude but not marked opposite areas of the photoconductive plate exposed to light pattern intensities of a magnitude lower or higher than said predetermined magnitude. Accordingly if the intensity of illumination of particular areas defining a light pattern is raised above (or below) said predetermined magnitude and the intensity of illumination of other areas defining the light pattern is raised up to (or lowered below) said predetermined magnitude, a reversal of marked areas results.

In the second embodiment, due to its configuration, the inhibiting effect of light intensities higher than said predetermined intensity can promote marking of the record sheet opposite areas of the photoconductive plate not exposed to any light or light of an intensity lower than the said predetermined intensity, but marking of these areas is enhanced if contiguous areas of the photoconductive plate are simultaneously exposed to light of said predetermined or marking intensity.

An object of the invention is to provide a method for recording light patterns employing radio frequency energy.

Another object of the invention is in the provision of apparatus wherein high frequency electric fields are selectively channelled through a record sheet in accordance with the light pattern intensities incident on a photoconductive plate such that the resulting gradients of voltage will dielectrically heat to recording temperature those portions of the recording sheet whose area in the plane of the record sheet defines the light pattern.

Another object of the invention is to provide apparatus comprising a photoconductive plate whose changes in conductivity in response to incident light patterns act to deform a high frequency electric field extending therethrough so that the potential gradients resulting from the deformation will heat to recording temperature portions of a contiguous recording sheet whose areas in the plane of the sheet define the incident light pattern.

A further object of the invention is to provide an assembly wherein a planar photoconductive plate is supported contiguous to spaced electrodes to provide light directed paths, in the plane of the photoconductive plate and a record sheet disposed adjacent thereto, for the electric lines of flux established between electrodes when a high frequency voltage is applied across the electrodes.

Another object of the invention is in the provision of apparatus for recording, by selectively dielectrically heating a visibly heat sensitive record sheet, positives or negatives of a light pattern, as desired, by control of the levels of illumination defining the light pattern incident on a photoconductive plate to thereby provide preferential paths in the record sheet for a radio frequency electric field.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
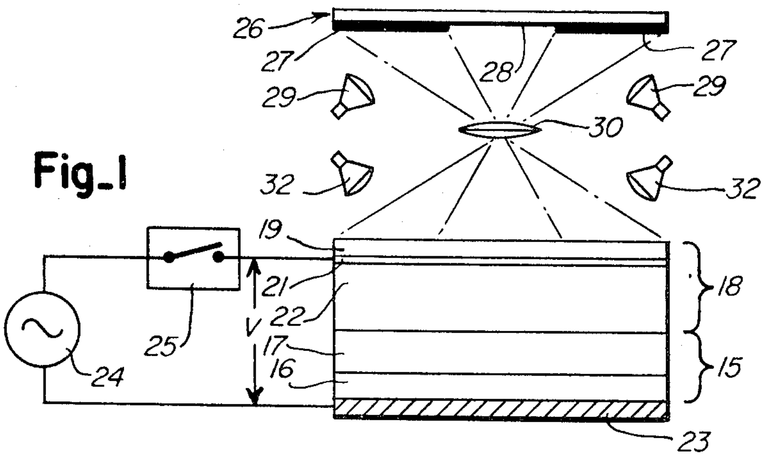
FIG. 1 is a schematic view showing the principal elements of a first embodiment of the invention hereinafter termed a parallel plate configuration with an operatively positioned recording sheet.

Referring now to the drawing wherein like reference characters designate like or corresponding elements throughout the several views there is shown in FIG. 1 record material in the form of a record sheet generally designated by reference character 15. The record sheet preferably comprises polar dielectric materials which are materials characterized by a dissipation factor which peaks at some frequency; non-polar dielectric materials being those characterized by a dissipation factor which is substantially constant over the full range of frequency and is relatively low. Preferably the record material will comprise one or more sheets of paper 16 each having a heat sensitive layer 17 coated thereon of the type which visibly chemically changes or a layer which transparentizes when its temperature is elevated to a predetermined recording temperature thereby to expose the colored surface of a paper sheet. Such record sheets are commercially known as thermographic copy paper and are as described for example in Pats. 2,663,656 and 2,710,263 respectively. Another example of the transparentizable type that may be employed is disclosed in Schwarz et al. Pat. 3,194,677.

The work required to raise the temperature of a material $\Delta T$ degrees, from ambient to a predetermined recording temperature, whereat in accordance with the invention a visible change occurs, is in accordance with the following well-known equation:

$$\text{Work}=WS\Delta T$$

where W is the weight in pounds of a volume of material, of area A and thickness $d$, times its density, and S is the specific heat of the material.

To do this work in a time $t$ requires a dissipation of power (work/unit time) of $$\frac{WS\Delta T}{t}$$

or $$P_{\text{required}}=\frac{WS\Delta T}{t} \qquad (1)$$

The power dissipated in a dielectric material is in accordance with the following $$P_d=E^2\omega C d_f \qquad (2)$$

where E is the voltage or potential gradient across a unit block of material of area A, thickness $d$, and dielectric constant $e$, $\omega$ is $2\pi$ times the frequency $f$, $d_f$ is the dissipation factor of the material at the frequency employed, and $$C\left(=\frac{KAe}{d}\right)$$

is the capacitance of the unit block of material.

Equating the power required to power dissipated and solving for $\Delta T$ $$\Delta T=\frac{E^2\omega C d_f t}{WS} \qquad (3)$$

Thus, to dielectrically heat and raise the temperature of a record sheet (or sheets) to a predetermined recording temperature in a given time requires a predetermined combination of voltage and frequency; the high the frequency, the lower the voltage and vice versa. The upper limit of voltage is the breakdown voltage of the record sheet to be dielectrically heated. Preferably at the frequency chosen, the dissipation factor of the record sheet material will be at or near its maximum.

With reference again to FIG. 1, there is shown a photosensitive photoconductive plate generally designated by reference numeral 18 comprising a transparent glass or mica support 19 having a conductive transparent coat 21 thereon. Over the transparent conductive coat is a photoconductive insulating layer 22 comprising in one embodiment Sylvania P–20 phosphor mixed in a 2.5:1 ratio with acrylic resin 100 sold by Union Carbide as LKSA/100. P–20 is the Joint Electron Device Engineering Council (JEDEC) number for a standard silver activated zinc cadmium sulfide phosphor. Acrylic resin 100 is a thermosetting acrylic polymer supplied as a water-white solution at 60 percent non-volatile in an organic solvent medium. This photoconductive insulating layer was applied with a thickness on the order of .003" and is characterized by a dielectric constant of 3. The photosensitive plate 18 may be suitably supported in a frame (not shown). The record sheet 15 is placed with its heat sensitive coat 17 preferably facing and in face to face contact with the photoconductive insulating layer 22. The conductive coating 21 on the glass and a conductive element or plate 23 disposed in face to face contact with the record sheet comprise plate electrodes and completes the sandwich constituting what is termed a parallel plate configuration.

In accordance with the invention a predetermined high frequency constant voltage source 24 is adapted to be connected across the sandwich for a predetermined time $t$, set by an electronic timer generally designated 25, in which recording is to be accomplished, while the photosensitive element 18 is exposed to a light pattern to be recorded. The source 24 may take the form of a Hartley oscillator link coupled to the load comprising the sandwich.

Figure 2:
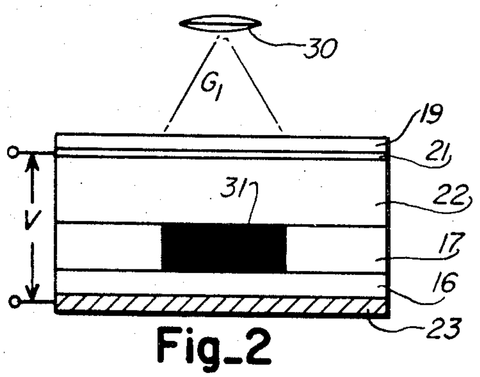
FIG. 2 is a view similar to FIG. 1 showing a light pattern reflected from a document directed on the photoconductive plate with the light intensities set to effect the recording of a negative of the document.

In FIG. 1 there is illustrated an original document generally designated by reference numeral 26 to be reproduced. The surface of the document has dark areas 27 defining with white or lighter areas 28 a light pattern. When the original document is illuminated by lamps 29, light reflected therefrom is imaged by lens 30 onto the photosensitive plate 18. If as shown in FIG. 2, the intensity of light reflected from white areas 28 is of a predetermined intensity generally designated $G_1$ as will hereinafter be specified, and higher than that reflected from areas 27, and a voltage V of a predetermined magnitude and frequency $f$ is applied across the sandwich for time $t$, the resistance of the photoconductive insulating layer over areas struck by light of intensity $G_1$, will be driven very low in a manner to be described, with the result that the density of the electric flux through areas of the record sheet opposite areas of the photoconductive insulating layer struck by light of intensity $G_1$ increases, such that the potential gradient or voltage dropped across those areas of the record sheet becomes substantially E and sufficient at the frequency employed to dielectrically heat the record sheet to recording temperature in a time $t$ producing a visible mark in layer 17 over areas 31 corresponding to document areas 28, i.e., the record is marked opposite areas of the photoconductive plate struck with light of intensity $G_1$ which is a negative of the light pattern of the original documennt 26.

Where the intensity of ambient light is higher than the intensity $G_1$ of light required to effect marking, the photosensitive plate 18 will normally be shielded from ambient light. However, where the level of ambient light is lower than the intensity $G_1$ of light required to effect marking or recording, the photosensitive plate 18 need not be shielded from ambient light.

Figure 3:
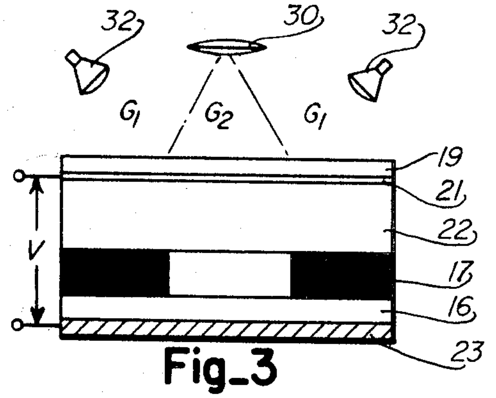
FIG. 3 is a view similar to FIG. 1 showing a light pattern incident on the photoconductive plate defined by a bias light of an intensity as to effect rcording in the record opposite areas struck thereby and by a simultaneously applied higher intensity light to inhibit recording opposite areas struck thereby with the result that positives of the document are recorded.

With reference to FIG. 3 if the photoconductive plate is illuminated as by lamps 32 providing light of marking intensity $G_1$, and simultaneously exposed to light reflected from document 26 in which the light reflected from white areas 28 is of a higher intensity generally designated $G_2$, the latter inhibits marking of the record sheet opposite areas of the photoconductive insulating layer struck by light of intensity $G_2$ and the recorded pattern is thus a positive of the light pattern of the original document.

Figure 4:
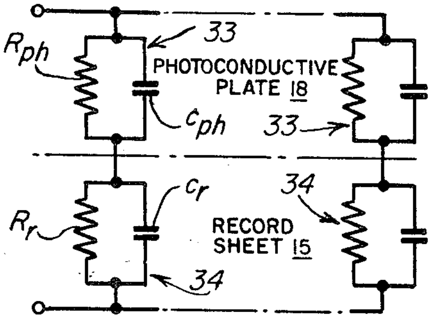
FIG. 4 is an electrical representation of the parallel plate recording configuration shown in FIG. 1.
Figure 5:
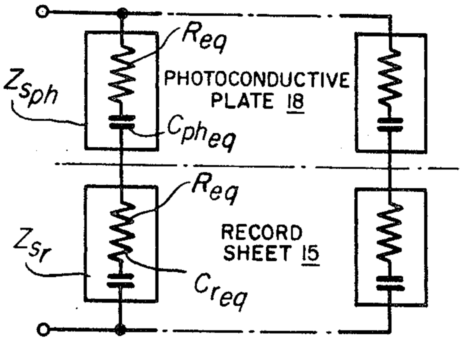
FIG. 5 is also an electrical representation of FIG. 1 showing the series equivalent circuits of each of the circuit paths shown in FIG. 4.

In explanation of this behavior it is assumed that electrically the parallel plate configuration of FIG. 1, considering paths through the sandwich of elemental area from plate 21 to plate 23, is as shown in FIG. 4 wherein each effective path across the voltage source comprises a parallel RC circuit 33, representing the material of photoconductive insulating layer 22, in series with a parallel RC circuit 34, representing record sheet material. Typically, in accordance with the invention the reactance of the photoconductive insulating layer, $X_{c_{ph}}$, is substantially equivalent to the reactance $X_{c_r}$ of the record sheet; the dark resistance of the photoconductive insulating layer, $R_{ph}$, is greater than the resistance $R_r$ of the record sheet, and both $R_{ph}$ and $R_r$ at the megacycle frequencies employed are greater than the reactance $X_{c_{ph}}$ and $X_{c_r}$ respectively. At 100 megacycles, the frequency at which the dissipation factor for typical record sheet is close to its peak value, assuming an elemental light struck area of .01 sq. in. (.1" x .1") and thicknesses of layer 22 and of record sheet 15 to be each .003" between plates, and taking the dielectric constants of the photoconductive insulating layer and of the record sheet to be substantially 3, the values of these parameters are $R_{ph}$ (dark or ambient) $=3\times10^5$ ohms
$R_r=11.8$K ohms
$X_{c_{ph}}=700$ ohms
$X_{c_r}=700$ ohms FIG. 5 shows the series equivalent circuit of the photoconductive insulating and record sheet material in each path of elemental area wherein the photoconductive insulating layer and record sheet parallel circuits 33 and 34 reduce to an equivalent resistance, $R_{eq}$, and an equivalent reactance $X_{eq}$ with the values of $R_{eq}$ and $X_{eq}$ determined, as is well known, in accordance with the following expressions:

$$R_{eq}=\frac{RX_c^2}{R^2+X_c^2} \quad (4)$$

$$X_{eq}=\frac{-jR^2X_c}{R^2+X_c^2} \quad (5)$$

In these equations, if R is greater than $X_c$ $$R_{e_q}=\frac{X_c^2}{R} \text{ and } X_{c_{eq}}=-jX_c;$$

thus the series impedance $$Z_s=\frac{X_c^2}{R}-jX_c \quad (6)$$

if $R=X_c$ $$R_{eq}=\frac{R}{2} \text{ and } X_{c_{eq}}=\frac{-jX_c}{2};$$

and thus $$Z_s=\frac{R}{2}-\frac{jX}{2} \quad (7)$$

if R is less than $X_c$ $$R_{eq}=R \text{ and } X_{c_{eq}}=\frac{-jX^2}{X_c}$$

Thus $$Z_s=R\ \frac{-jR^2}{X} \quad (8)$$

Since as noted above the resistance of the record sheet $R_r$ is greater than its reactance at the frequency employed, the equivalent impedance $Z_{s_r}$ of the record sheet is, substituting the record sheet parameters in the above formulas, $$Z_{s_r}=\frac{X_{c_r}^2}{R_r}-jK_{c_r}, \text{ a constant} \quad (9)$$

The resistance of the photoconductive insulating layer however varies inversely with light intensity and if its resistance could be decreased below the value of its reactance at the frequencies employed, the magnitude of the series equivalent impedance of the protoconductive insulating layer, $\overline{Z}_{s_{ph}}$, would, as illustrated by curve 35 in FIG. 6, be a relatively low value compared to the magnitude of the equivalent series impedance $\overline{Z}_{s_r}$, Equation 9, of the record sheet material. Thus substantially all of the voltage V would appear across the record sheet impedance $\overline{Z}_{s_r}$ and be effective to dielectrically heat the record sheet to recording temperature in time $t$. Thus the natural expected mode of the parallel plate configuration is to produce negatives, i.e., mark opposite those areas of the photoconductive layer struck with light (FIG. 2).

At present, however, applicant has been unable to find a commercially available photoconductive material whose resistance can be driven, even with very high intensity light, to values approaching the value of its reactance, much less to values lower than its reactance at the frequencies in the 100 megacycle range employed. With particular reference to FIG. 6, curve 35 is a curve of $\overline{Z}_{s_{ph}}$ on semi-log scales with $R_{ph}$ on the log scale, dotted line 41 intersects curve 35 at the value of $R_{ph}$ equal to $X_{c_{ph}}$; but since, as noted above, $R_{ph}$ cannot be driven with light to this value, the impedance $Z_{s_{ph}}$ of the photoconductive insulating layer over that portion of curve 35 to right of line 41 remains high and the voltage division between the photoconductive insulating layer and record sheet impedances in the circuit of FIG. 5 is such that the voltage dropped across the record sheet impedance $Z_{sr}$ whose constant magnitude is represented by dotted line 38 is not sufficient to mark.

Thus in the absence of a photoconductive material whose resistance can be driven lower than its reactance, which is very low at megacycle frequencies, it would appear that the process is not capable of selective dielectric heating of the record sheet opposite light struck areas of the photoconductive insulating layer.

In experimental attempts to drive the resistance of the photoconductive insulating layer low with light spots of high intensity $G_2$, it was noted unexpectedy that the record marked opposite areas outside the spot, i.e., areas exposed to light of a lower intensity $G_1$ such as that produced by a halo of light about the high intensity light spot, a halo evidently resulting from internal reflection in the glass or that produced by ambient light of intensity $G_1$. Thus applicant discovered that the material problem could be overcome in the parallel plate configuration by control of the level of illumination, i.e., selecting a light intensity $G_1$, as would, as now believed, maximize the power dissipation across the photoconductive insulating layer and thereby to promote heating of the photoconductive insulating layer to drive its resistance lower than its reactance. More particularly, applicant discovered that by employing a light level $G_1$ as would lower the resistance of the photoconductor toward that of the resistance of the record sheet, a much higher value than that of the photoconductor reactance at 100 megacycles, and more particularly to a value such that the series equivalent impedances of the photoconductive insulating layer and record sheet, $Z_{s_{ph}}$ and $Z_{s_r}$ respectively, would be substantially matched, maximum power would be dissipated across the photoconductive insulating layer over areas where struck with light of intensity $G_1$.

Figure 6:
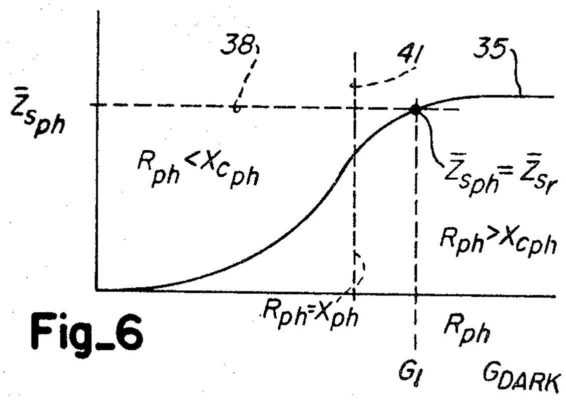
FIG. 6 is a curve showing the variation in the magnitude of the series equivalent impedance of the photoconductive layer with changes in resistance of the photoconductive layer resulting from changes in light intensity.
Figure 7:
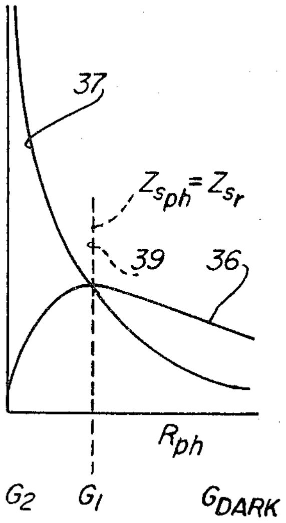
FIG. 7 are curves showing the relationship of power dissipation in the photoconductive layer and in the record sheet to changes in the resistance of the photoconductive layer with changes in light intensity.

With reference to FIG. 7 in which curve 36 represents the variation in power dissipated across the series equivalent photoconductive layer impedance shown in FIG. 5 with variation in photoconductor impedance caused by changes in $R_{ph}$ with light intensity, and curve 37 represents the variation in the power dissipated across the constant record sheet impedance as the photoconductive layer impedance varies, it is evident, according to known axioms, that maximum power will be developed across the photoconductive insulating layer when its impedance matches that of the record sheet; the condition indicated by the juncture of line 38 with curve 35 in FIG. 6 and the juncture of line 39 and curves 36 and 37 in FIG. 7. This dissipation of power in the form of heat acting, since the resistance of the photoconductive material varies inversely with heat, to lower the resistance of the photoconductor below its reactance with the result that the series equivalent impedance $Z_{s_{ph}}$ of the photoconductor RC circuit will drop rapidly to a negligible value, as illustrated by the series equivalent impedance magnitude curve 35 to the left of line 41 in FIG. 6. The consequent result is that almost all of the voltage V appears across the record sheet impedance $Z_{s_r}$ and has a magnitude E sufficient to heat the record sheet to recording temperature in time *t* opposite areas of the photoconductive plate struck with light intensity $G_1$, producing negatives as shown in FIG. 2.

As hereinbefore noted with reference to FIG. 3, positives of the incident light pattern can be recorded as well. The unexpected discovery that light of relatively low intensity $G_1$ as will effect an impedance match between photoconductive insulating layer and record sheet which produces heating in the photoconductive layer and a consequent lowering of its resistance (and impedance) to a negligible value, thereby as noted hereinbefore, to allow recording of negatives, allows the recording of positives.

With reference again to FIGS. 6 and 7, if the intensity of light $G_2$ incident on the photoconductor reduces $R_{ph}$ to such a level that $Z_{s_{ph}}$ is less than $Z_{s_r}$ (dotted line 38 FIG. 6), i.e., a mismatch, or to a level (to the left of line 39 FIG. 7), such that insufficient power would be dissipated across the photoconductive layer to appreciably heat it as would lower its $R_{ph}$ (and $Z_{s_{ph}}$), and as would result in sufficient voltage across the record impedance $Z_{s_r}$, no mark would occur opposite where light of high intensity $G_2$ is incident on the photoconductive layer. More particularly, to obtain a positive of the document 26, the photoconductive insulating layer is subjected to ambient light or to bias or background light generated by lamps 32 of a marking intensity $G_1$, which will produce an impedance match between the photoconductive insulating layer and record sheet parameters as would permit recording everywhere as noted above. Simultaneously the photoconductive plate is exposed to high intensity light $G_2$ reflected from areas 28 as shown in FIG. 3 through control of lamps 29 to thereby effect a mismatch between photoconductive insulating layer and record sheet impedances whereby, as noted hereinbefore, insufficient voltage would be across the record sheet opposite areas of photoconductive insulating layer struck with light of intensity $G_2$, inhibiting dielectric heating thereof.

Figure 8:
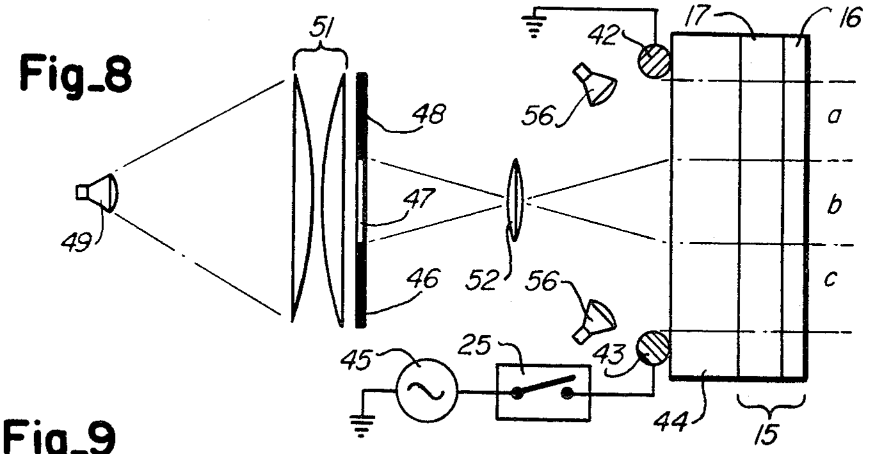
FIG. 8 is a schematic view showing a second embodiment of the invention hereinafter termed a two wire configuration with an operatively positioned record sheet.

With reference to FIG. 8 there is shown the embodiment designated as the two wire configuration which comprises a pair of spaced wire electrodes 42 and 43 having a diameter on the order of .250" which extend across the width of a suitably supported photosensitive or photoconductive plate comprising a photoconductive insulating layer 44 which may be self-supporting, impregnated in or coated on silk or coated on glass or mica. In one embodiment the photoconductive plate comprises Sylvania P–14 photoconductor mixed in a 2.5:1 ratio with Union Carbide resin LKSA–0100 and impregnated in silk. P–14 is JEDEC standard copper activated zinc cadmium sulfide phosphor. The photoconductive plate 44 is suitably supported in contact with the electrodes 42 and 43. A record sheet 15 is adapted to be held with its heat sensitive coat 17 against and in face to face contact with the photoconductive plate. When a high frequency alternating voltage E from source 45 is applied across the spaced electrodes for a time *t*, set by electronic timer 24, an electric field is established and extends through the planes of the photoconductive plate 44 and record sheet 15. In the dark or ambient, as the case may be as hereinbefore noted in the description of the parallel plate configuration, the density of the field will not be sufficient in the record element to heat it to recording temperature in a predetermined time *t*.

As shown in FIG. 8, the image to be reproduced may be a photographic negative 46 having transparent or light transmissive areas 47 and dark or non-light transmissive areas 48. A lamp 49 directs light through the negative 46 via collimating lens 51 and the light passing through the transparent areas 47 is imaged by a lens 52 onto the photoconductive plate surface. Alternatively light may be directed by lens 52 onto photoconductive plate 44 by reflection from white areas 28 of an original document 26 to be reproduced, in the manner shown in FIG. 1.

The two wire configuration differs from the parallel plate configuration in that the field established between electrodes 42 and 43 extends through the planes of the photoconductive insulating layer 44 and the plane of the record sheet 15 with the result that the source voltage E is dropped equally across each elemental serial section between electrodes. Assuming three sections, *a*, *b*, and *c*, and a source voltage of E, $E/3$ volts will be dropped across each section in the dark or ambient as the case may be. If light is directed toward one of the sections, e.g., section *b*, as would lower the resistance of the photoconductive plate, the magnitude of its impedance would also drop in accordance with curve 35 in FIG. 6, with the result that the source voltage dropped across sections *a* and *c* will increase accordingly, and if sufficient in magnitude be operative to dielectrically heat the contiguous sections of the record sheet in some time *t*. The natural expected mode of the two wire configuration therefore is the production of positives, i.e., no marking opposite areas of the photoconductive insulating layer 44 struck by light.

As hereinbefore noted no photoconductive material for use in a layer whose resistance can be driven lower than its reactance at the frequencies employed has been found. However, a sufficient drop in the resistance of the photoconductive plate toward the value of its reactance, in the region to the right of line 41 in FIG. 6, can be accomplished with light of high intensity $G_2$ as to effect a sufficient increase in the voltage across non-light struck areas to mark the corresponding contiguous areas of the record sheet.

It will be here noted that if the resistance of the photoconductive insulating layer could be reduced below its reactance as would render the impedance of the photoconductive material struck with light, e.g., section *b*, negligible, the voltage across each of sections *a* and *c* would be substantially half the source voltage and marking of positives would occur in shorter time intervals.

Figure 9:
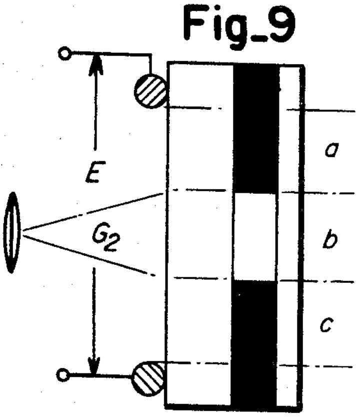
FIG. 9 is a view similar to FIG. 8 showing the recording of a positive of a light pattern.

Thus with reference to FIGS. 8 and 9 if the light from lamp 49 has a high intensity, $G_2$, record marking opposite areas struck with light $G_2$, corresponding to light transmissive areas 47, will be inhibited and record marking will occur opposite areas where no light of intensity $G_2$ strikes, thus producing a positive (FIG. 9) of the photographic negative 46.

Figure 10:
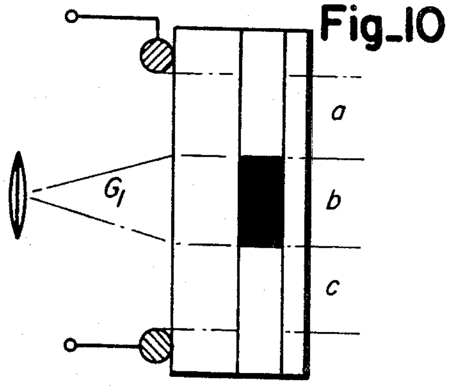
FIG. 10 is a view similar to FIG. 8 showing the recording of a negative of a light pattern.

If, however, the light $G_1$ from lamp 49 has a lower intensity, as will hereinafter appear, marking of the record occurs opposite areas of the photoconductive insulating layer struck with light $G_1$, corresponding to light transmissive areas 47, thus recording a negative of the photographic negative 46 as illustrated in FIG. 10.

Figure 11:
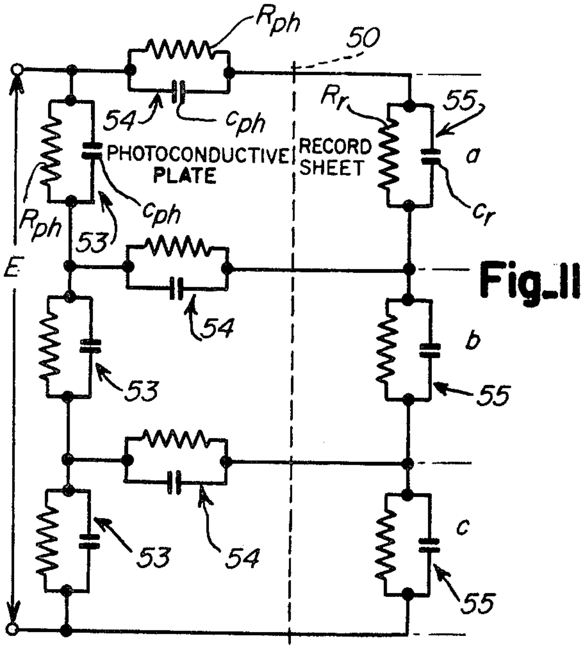
FIG. 11 is a schematic diagram representing the electrical equivalent of the two wire recording configuration in FIG. 8.
Figure 12:
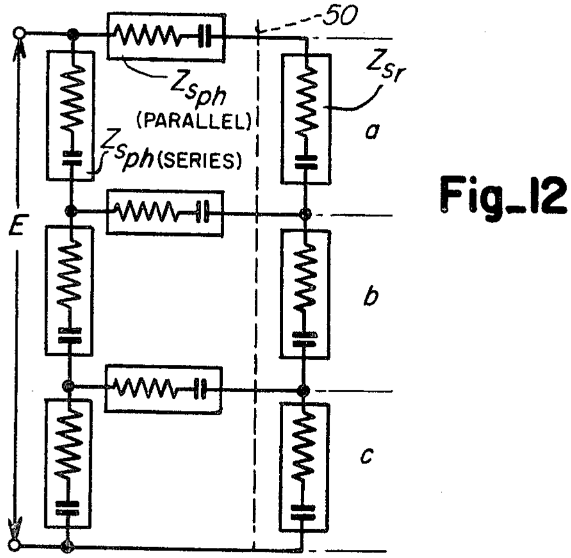
FIG. 12 is a schematic diagram showing the circuit with the series equivalents of the parallel circuits shown in FIG. 11.

For a more detailed explanation of the theory believed to support the above observed positive and negative marking in the two wire configuration, reference is directed to FIG. 11 which represents an electrical model of the FIG. 8 assembly, and to FIG. 12 which represents the series equivalent circuit of the parallel RC circuits shown in FIG. 11. Dotted lines 50 represent the interface between photoconductive plate and record sheet.

In the two wire configuration the resistance $R_r$ of the record sheet is greater than its reactance, $X_{c_r}$, and the dark (or ambient) photoconductive layer resistance $R_{ph}$ is greater than its reactance $X_{c_{ph}}$. In this configuration, assuming an elemental area .01 sq. in. in the plane of the photoconductive plate, the reactance of the photoconductive plate has a higher value than the reactance in the parallel plate configuration, as the value of capacitance, with the field extending through the planes of the plate, is determined by an area A, which is the product of the thickness of the photoconductive plate times a unit width of photoconductor, and a thickness *d* in the direction of field. Typical values, considering that an area of the photoconductive layer struck by light is .01 sq. in. as in FIG. 1, are:

$R_{ph}$ (dark)$=10^8$ ohms
$R_r=1.6\times10^7$ ohms
$X_{c_{ph}}=.8\times10^6$ ohms
$X_{c_r}=.8\times16^6$ ohms Assuming elemental sections, *a*, *b*, and *c*, including photoconductive plate 44 and record sheet 15 between electrodes, each section is characterized by a first or series connected parallel RC circuit generally designated 53 representing a surface path through the photoconductive plate shunted by a second or parallel connected RC circuit generally designated 54 representing a path through the thickness of the photoconductive plate which is in series with a parallel RC circuit generally designated 55 representing the record sheet parameters. Sections *b* and *c* are similarly represented. In FIG. 12 which shows the series equivalents of the FIG. 11 ciricuits 53, 54 and 55, the series equivalent impedance of circuit 53 is designated $Z_{s_{ph}}$ (series), that of circuit 54, $Z_{s_{ph}}$ (parallel), and that of circuit 54, $Z_{s_r}$.

POSITIVES

With a source voltage E applied across electrodes 42 and 43 each of the sections will have $E/3$ volts across its series connected photoconductor RC circuit 53 or $Z_{s_{ph}}$ (series) and $E/3$ volts across the parallel connected series combination of the photoconductive plate and record sheet RC circuits 54 and 55 respectively. With reference to FIG. 12 the voltage drop across the record sheet impedance $Z_{s_r}$ represented by circuit 55 is less than $E/3$ by the amount of voltage dropped across circuit 54 or $Z_{s_{ph}}$ (parallel). If light $G_2$ of high intensity is directed on section *b*, for example as shown in FIG. 9, as will appreciably reduce $Z_{s_{ph}}$ (series) (and $Z_{s_{ph}}$ parallel to a lesser extent as the resistivity through the thickness direction of the photoconductive layer is much higher than the surface resistivity) as to cause the voltage across the remaining sections *a* and *c* to increase sufficiently, as to cause an increase in the voltage dropped across the record sheet $Z_{s_r}$ in those sections, marking will occur in some time *t* as noted hereinbefore.

NEGATIVES

The same mechanism, i.e., matching the impedance of contiguous portions of photoconductive plate and record sheet as described with reference to the negative parallel plate mode is believed to account as well for the negative recording in the two wire configuration, i.e., mark where light strikes. When impedance $Z_{s_{ph}}$ (parallel) and $Z_{s_r}$ respectively of photoconductive plate and record sheet match, maximum power is dissipated across that section of the photoconductive layer and the heat generated therein lowers its resistance below that of its reactance. Thus, considering FIG. 12, if the level of illumination or intensity of light from lamp 49 is lowered or set to an intensity to $G_1$ such that $Z_{s_{ph}}$ (series) does not change appreciably, as to promote positive recording in a time *t* as noted above, the voltage dropped across circuit 53 will appear to $Z_{s_{ph}}$ (parallel) and series connected $Z_{s_r}$ as a constant voltage source. The change in $Z_{s_{ph}}$ (parallel) with low level light of intensity $G_1$ however will move $Z_{s_{ph}}$ (parallel) toward a match with the record sheet impedance $Z_{s_r}$. When this occurs, as hereinbefore noted with reference to FIG. 7, the power dissipated in the associated photoconductive plate section will heat and drive its resistance below that of its reactance, and the impedance $Z_{s_{ph}}$ (parallel) to a negligible value with the result that all of the voltage $E/3$ across $Z_{s_{ph}}$ (series) will appear across the record sheet impedance $Z_{s_r}$ and be sufficient to mark in a time *t*. This then records opposite where light of intensity $G_1$ in the light pattern strikes the photoconductive plate as illustrated in FIG. 10.

Figure 13:
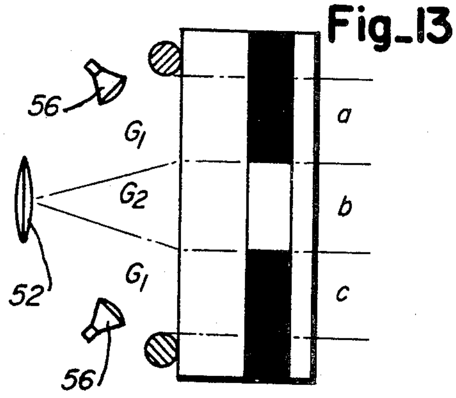
FIG. 13 is a view similar to FIG. 9 showing the recording of a positive of a light pattern using a bias light of marking intensity to enhance recording time.

With reference to FIG. 13 positive recording may be speeded up or enhanced when the sections *a* and *c* not exposed to high level image light $G_2$ from lamp 49 are simultaneously exposed to background or bias light of marking intensity $G_1$ from bias lamps 56 to promote marking as explained in the case of negative recording.

As the power required to mark in time intervals on the order of 5 milliseconds requires 50 volts/mil, larger spacing between electrodes in the two wire configuration requires larger input voltages as C, (Equation 3), decreases as spacing increases. From a practical point of view spacing between electrodes in the two wire configuration are limited to 250 mils and thus the size of images that can be reproduced is limited to typewritten characters having areas in the order of 0.1 sq. in.

In the parallel plate configuration, however, the thickness of record sheet between plate electrodes 21 and 23 is constant with changes in area of images, thus any size plates may be employed with the same magnitude of voltage input.

In applicant's copending application Ser. No. 594,263, now Pat. 3,386,551, character shaped high frequency electric fields dielectrically heat and record keyboard selected character patterns.

The hereinabove described processes may be similarly embodied in a typewriting application wherein keyboard actuation generates and directs, as by selection of and interposition of negatives 46 in FIG. 8, light of intensity $G_1$ defining character areas 47 onto the photoconductive plate of FIG. 1 or 8 for recording. The process also lends itself to copy machines as the light incident on the photoconductive plate may be reflected from an original to be copied. Further, the process lends itself to recording of any optical image or light, as for example, chart recorders when the record sheet is moved to provide a time base, and facsimile recorders, with the moving stylus taking the form of an information modulated light. Broadly then the process may be used to record any light patterns, either as visible marks on a record sheet or as latent changes which may be subsequently developed.

The herein described photoconductive plate configurations preferably include resins to provide relatively smooth, hard, abrasion resistant surfaces, and the term photoconductive insulator is used to describe layers of such resin-photoconductive material mixtures. It is to be here noted, however, that photoconductor materials may be deposited directly on a support plate, for example, as by sintering or evaporation. Thus, the term photoconductive plate is used generically.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A method for recording a light pattern in a heat sensitive dielectric record sheet which visibly changes when dielectrically heated to a recording temperature comprising, placing a said record sheet in contact with a photoconductive plate, exposing said photoconductive plate to a light pattern defined by light of first and second intensities to produce in said plate an electric field channelling latent impedance pattern corresponding to said light pattern, and subjecting said photoconductive plate and contacting record sheet to an alternating electric field of predetermined magnitude and radio frequency during the life of said latent impedance pattern, whereby the channelling of the electric field through said photoconductive plate and contacting record sheet only where said photoconductive plate is not exposed to light of said first intensity results in potential gradients within said record sheet sufficient to dielectrically heat said record sheet to said recording temperature in a predetermined time.

2. A method as recited in claim 1, said light of said second intensity causing the impedance of said photoconductive plate to match that of contacting record sheet sections whereby as a result of power dissipated in the photoconductive plate its impedance is reduced to a negligible value.

3. A method for recording a light pattern in a heat sensitive polar dielectric record sheet which visibly changes when heated to a recording temperature comprising, exposing to a said light pattern defined by light of predetermined and another intensity a photoconductive plate in contact with a said record sheet to produce a corresponding latent impedance pattern in said photoconductive plate, said light of predetermined intensity causing the impedance of said photoconductive plate to be lowered, and during the life of said impedance pattern subjecting said contacting photoconductive plate and record sheet to an alternating electric field of predetermined magnitude and radio frequency which only where channeled through low impedance paths created by exposure to light of said predetermined intensity causes dielectric heating of said record sheet to recording temperature in a predetermined time and thereby recording said light pattern in said record sheet.

4. A method for recording light patterns in polar dielectric record sheet material which visibly changes when dielectrically heated to a predetermined recording temperature, said light patterns being defined by first and second light intensities, comprising, exposing to said light pattern a photoconductive plate in contact with a said record sheet, controlling the level of illumination incident on said photoconductive plate such that light of said first intensity only will effect an impedance match between contacting sections of said photoconductive plate and record sheet so that when subjected to an alternating electric field of predetermined magnitude and radio frequency selective dielectric heating of the photoconductive plate and lowering of its impedance to a negligible value will be promoted, and subjecting said photoconductive plate and record sheet to an alternating radio frequency electric field of said predetermined magnitude and radio frequency during exposure to said light pattern whereby the full magnitude of the dielectric field will dielectrically heat only said record sheet sections contacting photoconductive plate sections of negligible impedance to said predetermined recording temperature in a predetermined time.

5. A method for the production of a recording, corresponding to a light pattern, in a polar dielectric recording sheet which undergoes visible modification when dielectrically heated to a recording temperature, disposing said recording sheet in contact with and parallel with a photoconductive plate whose unexposed impedance is higher than the impedance of said recording sheet, establishing a radio frequency electric field through said parallel disposed recording sheet and said photoconductive plate, said radio frequency electric field having a magnitude sufficient over a predetermined time interval to cause dielectric heating of said dielectric sheet to said recording temperature, and exposing said photoconductive plate to a said light pattern which includes light of two intensities corresponding to light and dark areas of an image to be recorded, one of said light intensities having a magnitude which causes a matching of said recording sheet and photoconductive plate impedances, said electric field effecting a lowering of the impedance of the photoconductive plate to negligible value only where exposed to impedance matching light intensity whereby said recording sheet in contact with said photoconductive plate exposed to impedance matching light intensity will be subjected to substantially the full magnitude of the established electric field and selectively dielectrically heated thereby to recording temperature.

6. A method according to claim 5, wherein that light intensity which causes a matching between the impedance of the photoconductive plate and of the dielectric recording sheet is the maximum light intensity in a light pattern to which the photoconductive plate is exposed and corresponds to light areas of an image to be recorded, thereby to produce a negative of said image.

7. A method according to claim 5, wherein that light intensity which causes a matching between the impedances of the photoconductive plate and of the dielectric recording sheet is the minimum light intensity in a light pattern to which the photoconductive plate is exposed and corresponds to dark areas on an image to be recorded, thereby to produce a positive of said image pattern.

8. A method of recording a light pattern as recited in claim 5, said electric field flux lines being perpendicular to the planes of said recording sheet and photoconductive plate.

9. A method of recording a light pattern as recited in claim 5, said electric field flux lines being parallel to the planes of said recording sheet and photoconductor plate.

References Cited

UNITED STATES PATENTS

| | | | |
|---|---|---|---|
| 2,798,959 | 7/1957 | Moncrieff-Yeates | 96—1.5 X |
| 2,764,693 | 9/1956 | Jacobs et al. | 250—65 |
| 2,866,903 | 12/1958 | Berchtold | 250—65 |
| 3,128,198 | 4/1964 | Dulmage et al. | 117—17.5 |
| 3,316,088 | 4/1967 | Schaffert | 96—1.5 |
| 3,318,697 | 5/1967 | Shrewsbury | 96—1 R |
| 3,409,431 | 11/1968 | Deutsch | 96—1 R |
| 3,462,285 | 8/1969 | Thompson | 117—93.1 DH |

OTHER REFERENCES

P. M. Cassiers, "Electrothermography—A New Electrostatic Printing Technique," Photographic Science and Engineering, vol. 4, No. 4 (July–August 1960), pp. 199–202.

CHARLES E. VAN HORN, Primary Examiner

U.S. Cl. X.R.

96—1.3; 250—65 T; 346—76; 340—173 CH; 219—216

UNITED STATES PATENT OFFICE
CERTIFICATE OF CORRECTION

Patent No. 3,752,667 Dated August 14, 1973

Inventor(s) Anthony D'Onofrio

It is certified that error appears in the above-identified patent and that said Letters Patent are hereby corrected as shown below:

In The Drawing:

Figure 5, the lead line from $Cr_{eq}$ should be directed to the capacitor symbol.

Figure 6, "$R_{ph} = X_{ph}$" below the abscissa line should read --$R_{ph}=Xc_{ph}$--.

In The Specification:

Column 1, line 63, before "light" insert --a--.

Column 2, line 7, after "pattern" insert --is--.

Column 4, line 28, change "high" to --higher--.

Column 6, line 21, change "$R_{eq}=R$ and $Xc_{eq}= \frac{-jX^2}{X_c}$" to read --$R_{eq}=R$ and $Xc_{eq}= \frac{-jR^2}{X_c}$ --.

Column 6, line 45, "9" should read --(9)--.

Column 6, line 47, change "$\bar{Z}s_r$" to read --$Zs_r$--.

Column 6, line 62, change "$Zsph$" to read --$\bar{Z}sph$--.

Column 9, line 53, change "$Xc_r=.8X16^6$ ohms" to read --$Xc_r=.8X10^6$ ohms--.

In The Claims:

Claim 4, Column 12, line 23, change "dielectric" to read --electric--.

Signed and sealed this 23rd day of July 1974.

(SEAL)
Attest:

McCOY M. GIBSON, JR.
Attesting Officer

C. MARSHALL DANN
Commissioner of Patents